June 9, 1942.　　　　J. A. GITS ET AL　　　　2,285,963
KNOB STRUCTURE AND METHOD OF MAKING SAME
Filed May 6, 1938
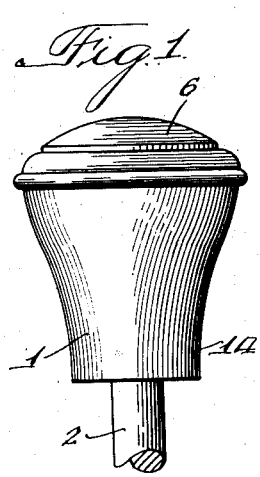
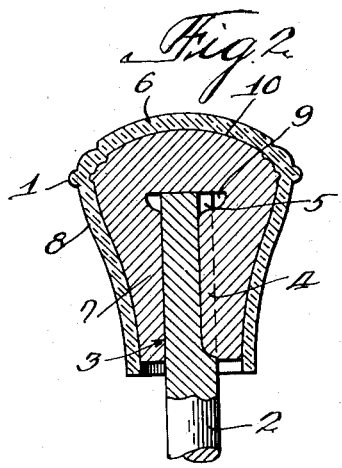
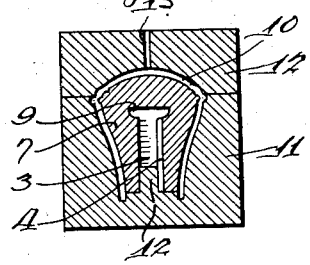
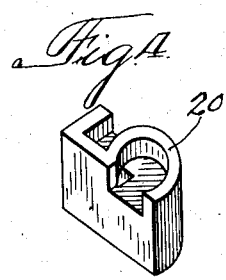
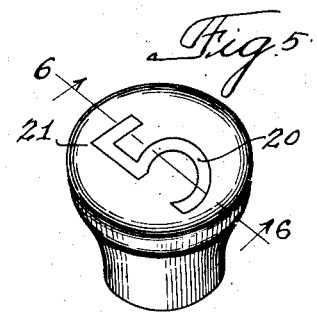
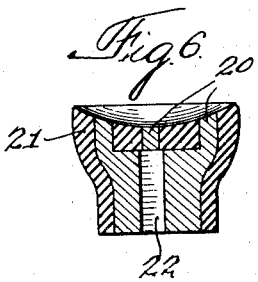
Inventors
Joseph A. Gits
Jules P. Gits
By Ames, Thiess, Olson & Mecklenburger Patented June 9, 1942

2,285,963

UNITED STATES PATENT OFFICE 2,285,963

KNOB STRUCTURE AND METHOD OF MAKING SAME

Joseph A. Gits and Jules P. Gits, Chicago, Ill.

Application May 6, 1938, Serial No. 206,359

6 Claims. (Cl. 18—59)

This invention relates to the manufacture of solid articles and more particularly to articles of this type that are molded.

Although we have shown and described our invention as applied to knobs capable of a wide variety of uses, it will be understood that the invention may be embodied in the manufacture of many other structures whether of dissimilar design or use. Devices of a solid molded construction are widely used and may also include such devices as typewriter and calculating machine keys, as well as knobs, etc., and consequently, the invention is not to be limited to any particular type of device or application.

Plastic materials of various compositions are particularly noted for their shrinkage during the cooling period of the molding operation. If bodies that are molded have thicknesses, say of one-eighth inch or more, shrinkage marks are difficult to prevent. These marks must be thereafter buffed or polished out which is relatively expensive to perform. If the shrinkage is too great, considerable waste is apt to result. Shrinkage and its effects upon the finished product has always been a difficult problem in molding solid articles.

Broadly, an object of the invention resides in a two step operation in the molding of solid articles whereby the first step will produce a core representing a substantial portion with respect to the total thickness of the articles to be formed and the second step will include molding a relatively thin layer about the core, this layer being of a cross section that will cool evenly and avoid the formation of shrinkage marks due to the relatively small mass of material therein.

A further object of the invention is to provide an improved form of construction whereby the device herein disclosed may be produced at no greater expense than heretofore, but in a manner retaining all the benefits of a solid construction and effectively overcoming the difficulties of shrinkage.

Consequently, the articles will not require buffing off or polishing out of shrinkage marks, nor will any waste occur in instances where shrinkage might be of a character necessitating the discarding of the articles.

It is a further object of the invention to mold the relatively thin layer or shell of material about the core of greater mass in a manner causing the shell to adhere firmly to the core so that it cannot be displaced from the core and will be perfectly formed thereabout.

Other objects and advantages of the invention will be apparent from the following description taken in connection with the accompanying drawing which forms a part hereof.

In the drawing:

Figure 1 is a side elevation of a knob formed by the present method and embodying the present invention;

Fig. 2 is a vertical sectional view of this knob;

Fig. 3 illustrates the core member in a die prior to the second molding operation forming the shell;

Fig. 4 is a detailed view of another type of core member having the specific design of a numeral;

Fig. 5 illustrates this numeral core member surrounded by a shell to form a typewriter or calculating machine key or the like; and, Fig. 6 is a vertical sectional view taken on line 6—6 of Fig. 5.

One apt embodiment of the invention is illustrated in Figs. 1 to 3, inclusive. Knob 1 is of a type that may be used at the end of any suitable shaft 2. Its use may be for radios as a dial knob, on automobile gear shift levers, door knobs, knobs for automobile radiator ornaments, knobs forming ornamental tips on different structures, and for other analogous purposes, although the construction, principle and mode of operation involved may be applied to a great variety of devices.

Knob 1 is of solid construction except for the medium of attachment to shaft 2. In the illustration, shaft 2 is adapted to enter and lie in a central opening 3. Relative rotation between knob 1 and shaft 2 is prevented by an integrally formed rib 4 acting as a spline and engaging in a groove 5 in shaft 2. Axial displacement of knob 1 from shaft 2 may be readily prevented by any one of a number of ways readily apparent to those skilled in the art.

It will be apparent that knob 1 in its entirety is of substantial mass. It is well known that knobs of this mass will experience considerable shrinkage during the cooling step in the molding operation. Shrinkage marks will appear upon the exterior surface of the finished product, particularly upon end face 6. Before the device may be used, such shrinkage marks must be removed either by a buffing operation or by a polishing operation, which, in either case, is expensive and apparently unnecessary when and if the product may be molded without the occurrence of shrinkage marks. The problem of shrinkage marks has caused considerable concern to manufacturers of products of this type and has resulted in waste, expense and loss of time.

The present invention solves this problem by forming knob 1 in two parts, to-wit, core member 7 and shell member 8. Inasmuch as shrinkage cannot be eliminated where the mass of the body to be molded is substantial, core member 7 has been formed to represent a substantial part or a greater portion of the mass cross-sectionally of knob 1. To illustrate the effects of shrinkage upon a body of the mass cross-sectionally of core member 7, it will be noted that the interior of the latter at the inner end of central opening 3 where the mass is substantially the greatest has contracted to form an enlargement or cavity 9. The latter is, of course, unobjectionably located at this point in a construction of knob 1. The shrinkage that caused the enlarged cavity 9 interiorly of core member 7 produces marks upon face 10 of core member 7 that require buffing out or polishing off to provide a finished surface and a merchantable product.

To eliminate the expense of these latter operations, core member 7 is inserted into a second mold 11 which may be provided with a central projection 12 upon which core member 7 is seated, the latter thereby being centered within the cavity of mold 11. Patrix member 12 of the mold will likewise have a cooperating cavity so that during a second molding operation the material entering by injection through conduit 13 will form a shell 8 about core member 7 of any desired thickness, it being noted that the invention is directed to providing shell 8 of a thickness that will not leave shrinkage marks upon its outer face when cold. The cavity in mold members 11 and 12 surrounding core member 7 after it is seated in member 11 will determine the shape and thickness of shell 8.

The process contemplates an injection molding operation to form shell 8. We have found that this type of molding is preferable although not essential. If the material is injected at pressures, say from twelve to fifteen tons per square inch, a perfect shell will result and a bond established between core member 7 and this shell 8 that prevents separation. It is appreciated that the very nature of the design of knob 1 shown in the drawing provides a mechanical lock between core member 7 and shell 8. However, if knob 1 is of different design and is not provided with a tapered end 14, the bond created by the injection operation under a high pressure will be sufficient to prevent the aforesaid separation.

It will be observed that shell 8 may be of a thickness cross-sectionally not greater than one-eighth of an inch. We have found at the present time that bodies or walls of thickness not greater than one-eighth of an inch may be molded without the appearance of shrinkage marks upon their exterior surfaces. We mention one-eighth of an inch as an example of one dimension that will prevent shrinkage marks from appearing upon the surface of the finished product. It will be understood, however, that we do not intend to be limited to this dimension in connection with practicing the present invention because different dimensions might be used by those skilled in the art without deviating from the principles herein disclosed. The essential feature is to mold the solid member into two parts to form the outer part about the inner part in a molding operation that may be carried out in a manner eliminating shrinkage. If shrinkage will appear in the molding of a body due to its mass, such shrinkage may be eliminated, in accordance with the teachings of the invention, by molding a portion thereof in an initial molding operation and then by molding the portion forming the exterior surfaces by a second operation to provide a shell about the first portion.

Such a construction is further illustrated in Figs. 4, 5 and 6. In this instance the central portion 20 may be a numeral. Shell 21 formed about central numeral 20 may produce a finished product in the form of a typewriter or calculating machine key. Numeral 20 may be molded of the same or different plastic material as shell 21, and may be given a different color, if so desired, so as to provide a desirable contrast and eliminate the operation heretofore of painting the numeral upon the face of the key. The present construction prevents any wearing or destruction of the numeral representation. After numeral 20 is formed by a molding operation, it is placed in a die similar to that designated 11 in Fig. 3. The remaining portion of the cavity of the die will determine the shape of shell 21 and the thickness of its wall. Numeral 20 cannot be displaced from shell 21 due to the fact that the second molding operation is by injection and a bond is thereby formed that will securely hold numeral 20 within shell 21. A suitable opening 22 may be formed in the base of shell 21 to provide means for connecting the key to a proper mounting, such as a key bar in a typewriter or calculating machine.

It will be apparent from the foregoing description that the invention provides a unique type of solid molded construction that eliminates shrinkage marks appearing upon the finished surfaces of the product. The construction is simple, practical and economical to produce.

Moreover, the principle and method employed may have a wide application and accordingly the invention is not limited to the specific forms of embodiments disclosed.

Without further elaboration, the foregoing will so fully explain the gist of our invention that others may, by applying current knowledge, readily adopt the same for use under varying conditions of service, without eliminating certain features, which may properly be said to constitute the essential items of novelty involved, which items are intended to be defined and secured to us by the following claims.

We claim:

1. The method of controlling shrinkage in the molding of an article of thermoplastic material to eliminate shrinkage marks upon the exterior surface of said article which comprises molding all but a thin outer layer of said article in a preliminary molding operation so as to confine a substantial part of the shrinkage to a core thus formed, placing said core in a mold cavity of the size and shape of the finished article, and forming a thin finishing layer of a predetermined thickness about said core by a second molding operation, the thermoplastic material forming said finishing layer being injected under pressure while in a plastic condition, said layer being of a thickness that will cool upon said core without shrinking sufficiently to form marks upon its exterior surface.

2. The method of controlling shrinkage in the molding of an article of thermoplastic material to eliminate shrinkage marks upon the exterior surface of said article which comprises injecting thermoplastic material under pressure while in a plastic condition into a mold cavity and allowing the material to cool to form a core of substantial mass so that a substantial part of the shrinkage will be confined to said core and the marks that form from such shrinkage will appear upon said core, placing said core in a second mold cavity of the size and shape of the finished article, and injecting thermoplastic material under pressure while in a plastic condition to form a thin layer about said core which when cooled will shrink but insufficiently for the mass of thermoplastic material in said layer to form shrinkage marks upon the exterior surface thereof.

3. The method of molding an article of thermoplastic material in the form of a head or the like with a finished end face devoid of shrinkage marks which comprises injecting thermoplastic material under pressure while in a plastic condition in a mold cavity of a size slightly less than the finished article so that substantially all the shrinkage upon cooling will be confined to the material injected in said mold cavity, then placing the cooled material in a second mold cavity slightly larger than the first mold cavity and of a size equal to the finished article, and injecting thermoplastic material under pressure while in a plastic condition into said second mold cavity for substantially even distribution about said core to form a thin layer which upon cooling will be devoid of shrinkage marks upon its exterior surface.

4. The method of controlling shrinkage in the molding of an article of thermoplastic material to eliminate shrinkage marks upon the exterior surface thereof by forming said article in two operations, the first operation comprising making an inner or core part of a mass that represents a substantial part of the total mass of the finished article, the second operation comprising positioning said core in a mold cavity of the size and shape of the finished article and injecting thermoplastic material under pressure while in a plastic condition to form a thin layer about said core which when cooled will shrink but insufficiently for the mass of thermoplastic material in said layer to form shrinkage marks upon the exterior surface thereof.

5. In a solid article molded of thermoplastic material characterized by its die formed smooth surfaces, a die cast thermoplastic core having substantially the same contour and size as the finished article and comprising a substantially greater part of the finished article, and a die cast thermoplastic layer about said core, said thermoplastic layer being of a thickness insufficient for shrinkage marks to be formed about its exterior surface.

6. In a key button, a die cast thermoplastic key part having a predetermined surface contour, a die cast thermoplastic insert arranged within said part and having at least a portion thereof conforming in contour to the contour of the indicia to be represented by said key part, said insert having detents on the surfaces thereof, the thermoplastic key part having integral portions extending into the detents of the thermoplastic insert, and a portion of said thermoplastic insert having the contour of the indicia to be represented being exposed through one surface of said thermoplastic key part.

JOSEPH A. GITS.
JULES P. GITS.